United States Patent [19]

Gray et al.

[11] Patent Number: 4,626,658

[45] Date of Patent: Dec. 2, 1986

[54] ELECTRICALLY HEATED TOOL FOR SOLDERING PIPE CONNECTOR SLEEVES

[75] Inventors: Kenneth Gray, Beaulieu, England; Albert Tucker, Cornwall, United Kingdom

[73] Assignee: Antex (Electronics) Limited, London, England

[21] Appl. No.: 663,887

[22] Filed: Oct. 23, 1984

[30] Foreign Application Priority Data

Oct. 24, 1983 [GB] United Kingdom ............... 8328338

[51] Int. Cl.[4] ............................ B23K 3/04; H05B 1/00
[52] U.S. Cl. .................................... 219/230; 219/225; 219/236; 219/243; 228/51
[58] Field of Search ............... 219/225, 226, 230, 243, 219/236, 237; 228/51–55, 57

[56] References Cited

U.S. PATENT DOCUMENTS

| | | | |
|---|---|---|---|
| 1,422,826 | 7/1922 | Brown | 219/236 |
| 1,845,475 | 2/1932 | Benson | 219/230 X |
| 2,001,538 | 5/1935 | Mueller et al. | 219/230 X |
| 2,226,194 | 12/1940 | Berolsky | 219/230 X |
| 2,470,854 | 5/1949 | Kovac | 219/230 X |
| 3,804,320 | 4/1974 | Vandermark | 228/51 X |
| 3,895,214 | 7/1975 | Winter | 219/230 |
| 4,205,221 | 5/1980 | Meyer | 219/230 |

FOREIGN PATENT DOCUMENTS

| | | | |
|---|---|---|---|
| 2830016 | 2/1979 | Fed. Rep. of Germany . | |
| 987604 | 4/1951 | France | 219/230 |
| 1151254 | 8/1957 | France . | |
| 480374 | 2/1938 | United Kingdom | 219/230 |
| 680650 | 10/1952 | United Kingdom | 219/230 |
| 945402 | 12/1963 | United Kingdom | 219/230 |
| 1085972 | 10/1967 | United Kingdom | 219/230 |
| 1208645 | 10/1970 | United Kingdom | 219/236 |
| 2000948 | 1/1979 | United Kingdom . | |

Primary Examiner—A. Bartis
Attorney, Agent, or Firm—Remy J. VanOphem

[57] ABSTRACT

An electrically heated tool for heating a pipe connector sleeve in order to melt solder therein or applied thereto to secure the sleeve to a pipe has a pair of arms (1) hingedly connected to one another between their ends by a pin (2) in the manner of pliers. An electric heating unit (3) having an elongated shaft portion (9) enclosing an electric resistance heating element is detachably secured to and projects from one and the same end of each arm. The free end of each shaft portion (9) is detachably slidably inserted into the tubular shank of a metallic head part (4) having a semi-circular recess (4a) of a radius substantially equal to the radius of the pipe or sleeve to be heated. The arms are movable between an open position in which the recesses are spaced apart and a position in which the recesses are closed together around a pipe connector sleeve so as to apply heat thereto.

4 Claims, 9 Drawing Figures

ELECTRICALLY HEATED TOOL FOR SOLDERING PIPE CONNECTOR SLEEVES

BACKGROUND OF THE INVENTION

This invention relates to a tool for use in heating a pipe connector sleeve in order to melt, within the sleeve, the solder which serves to secure the sleeve to the pipe by solidification of the solder so as to insure a fluid tight joint. The solder in the solid state may pre-exist within cavities in the sleeve or may be applied at the points of pipe entry to the tube and flow therein by capillary action when melted.

It is the usual practice to heat these pipe connector sleeves when the pipes are in situ by means of a blow lamp, hot air gun or gas torch. However, application of the flame or hot air to the sleeve usually results in burning of the adjacent part of the building structure. Also the use of a blow lamp or torch in confined spaces is difficult and undesirable if the work has to be done in a combustible environment. The flame or hot air from a blow lamp or torch also tends indiscriminately to heat the other end of the sleeve so that heating a pipe connector sleeve having one end already secured to a pipe can cause the secured end to become unsecured or cause it to leak.

There is, thus, a need for a tool which overcomes the disadvantages of using a blow lamp or torch for heating a pipe connector sleeve.

SUMMARY OF THE INVENTION

According to the present invention in its widest aspect, a tool for heating a pipe connector sleeve, in order to melt solder provided therein, or applied thereto, to secure it to a pipe, comprises a pair of hingedly connected arms each of which at one and the same end has an electrically heatable element disposed in thermally conductive relation to a head part formed with a part-circular recess, the arms being movable between a position in which the semi-circular recesses are spaced apart and a position in which the semi-circular recesses can be closed together around a pipe connector sleeve so as to apply heat thereto. The electrically heatable element of each arm has a shaft portion and the head part carried by each arm has a tubular shank by which it is attached, removably, to the shaft portion of the associated electrically heatable element, whereby the head portions carried by the pair of arms may be rapidly changed.

The arms may be connected together at one end by a hinge portion which may include a flexible or resilient connection integral with the arms in the manner of fire tongs as specifically described in British Patent Application No. 8328338 from which the present application claims priority.

Preferably, however, the arms are pivotally connected at a hinged connection intermediate their ends in the manner of a pair of scissors or pliers.

BRIEF DESCRIPTION OF THE DRAWINGS

A preferred embodiment of the invention is illustrated in the accompanying drawings, in which.

DETAILED DESCRIPTION OF THE PREFERRED EMBODIMENT

Figure 1:
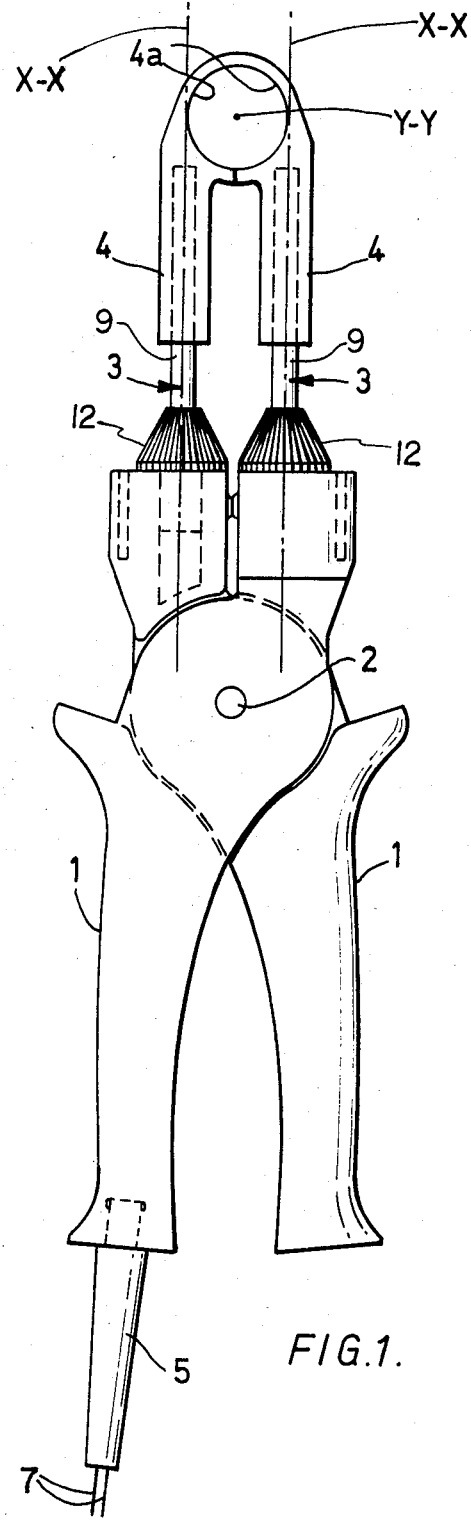
FIG. 1 is a side elevation of a complete tool according to the present invention.

Referring now to the drawings, the tool essentially includes, as shown in FIG. 1, first and second arms made of a molded heat resistant, electrically insulating material. The arms 1 are pivotally connected to one another by a pin 2 in the manner of pliers. Each of the first and second arms 1 carries at one and the same end an electric heating element 3 with a shaft portion 9 for heating a detachable metallic head part 4 which is formed with a semi-circular recess 4a of a radius substantially equal to the external radius of a pipe sleeve to which heat is to be applied for melting solder already provided therein or applied to the ends thereof. Each such shaft portion 9 has a longitudinal central axis X—X extending therethrough, and each such semi-circular recess 4a has a central axis Y—Y which is positioned transverse to and between the central longitudinal axis X—X of the shaft portions 9 of each of the first and second arms 1, the central axis Y—Y of each semi-circular recess 4a being coextensive when the first and second arms 1 are in the position shown in FIG. 1. Also shown is a 3-conductor electric supply flex 5 which extends through one of the arms 1 and is connected through terminal blocks appropriately to each of the electric heating elements 3 of the first and second arms 1, respectively.

Figure 2:
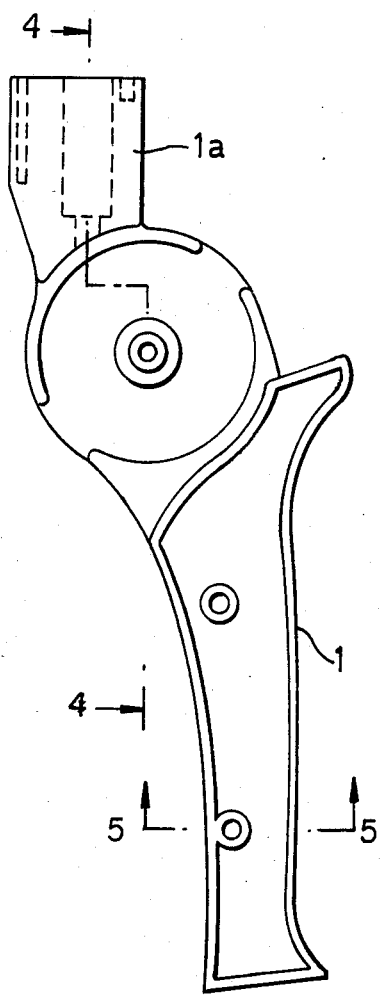
FIGS. 2 and 3 are elevations of the inside moldings of the tool of FIG. 1 which, with other molding fit together to form the arms of the tool.
Figure 3:
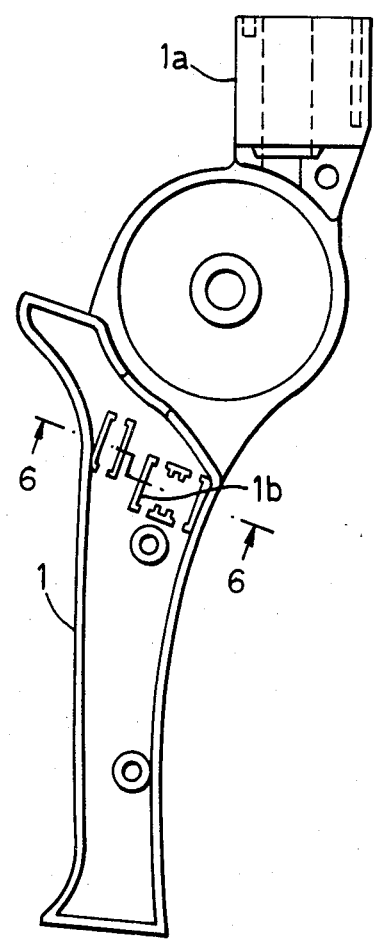
Figure 4:
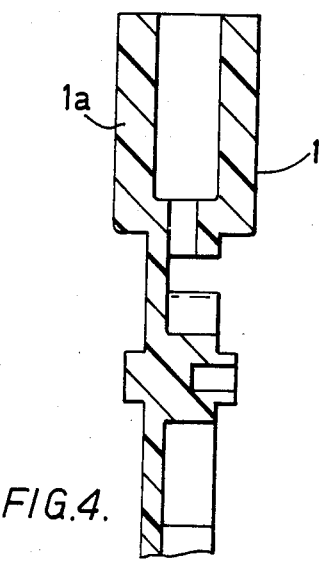
FIG. 4 is a section on line 4—4 of FIG. 2.
Figure 5:
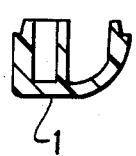
FIG. 5 is a section on line 5—5 of FIG. 2.
Figure 6:
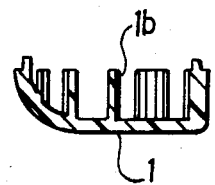
FIG. 6 is a section on line 6—6 of FIG. 3.

As shown in FIGS. 2, 3 and 4 each arm 1 has at one end a socket 1a for receiving an end of an electric heating element 3, and each of the first and second arms 1 is formed internally with cable guide means and an enclosure 1b for locating a terminal connection block (not shown). The head parts of each of the first and second arms 1 may be interchanged with other head parts having recesses of a different but identical size to suit different diameter pipe joints.

Figure 7:
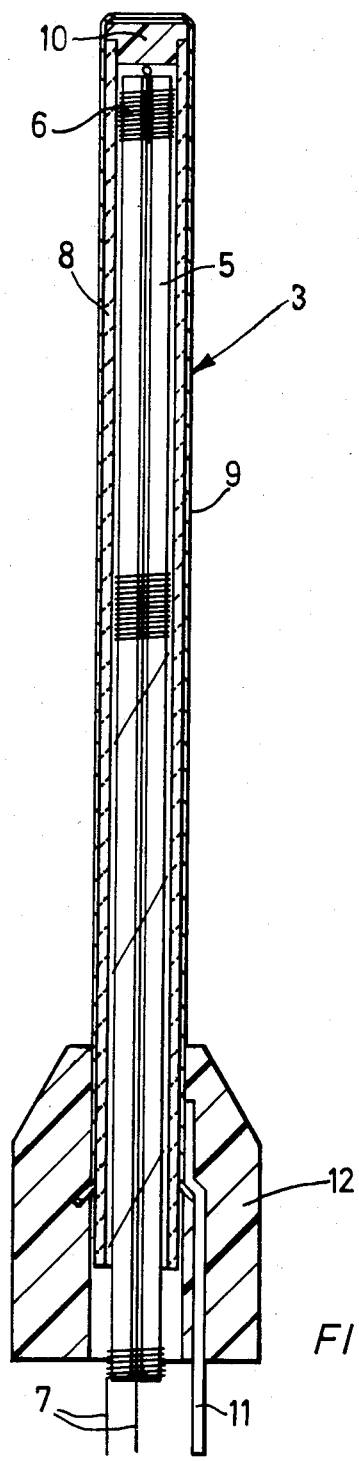
FIG. 7 is a longitudinal section through a heating element of the tool of FIG. 1.

Referring now to FIG. 7, each electric heating element 3 includes a cylindrical ceramic former 5 around which there is coiled a resistance winding 6 with pure nickel or other metallic lead-out wires 7. The winding 6 is surrounded by an alumina tube 8 and the latter is encased in a stainless steel or other tubular shaft portion 9 which transfers heat to the head part 4. One end of the tubular shaft portion 9 is closed by a plug 10 while the other end has an attached grounding pin 11 and is supported within a bushing 12 made of electrically insulating material and having a bore for accommodating the grounding pin 11.

This bushing 12, which may be externally corrugated as shown in FIG. 1 to assist cooling, fits onto the socket 1a, of an arm 1 which is suitably bored to receive the projecting parts of the electric heating element 3. As shown in FIG. 1, each head part 4 has a tubular shank into which the outward end of the tubular shaft portion 9 is slidable.

The tool can be optionally fitted with an on/off switch, a variable temperature control circuit and a power-on indicator if required. Further, it may be equipped with a guard or shield to enable it to be safely laid down upon an otherwise heat-damageable surface.

There may also be provided a mechanism to assist in the changing of the head parts 4 when these are very hot.

Means may be provided for automatically aligning the head parts in the correct plane when slid over the elements and the tool can be made to accommodate elements of various different wattages to operate on various different voltages.

By variation of temperature and by the substitution of an infinite variety of suitably shaped head parts, the tool can be used for applying heat to pipes of any cross-sectional shape whether such pipes are made of metal or plastic material. The tool may also conceivably be used for the welding of synthetic material ropes, the soldering of wave guide flanges and the thawing of frozen pipes.

Normally the warm-up time from cold to working temperature is arranged to be between 30 seconds and 3 minutes and the time to complete a soldered metal joint should be less than 10 seconds.

Figure 8:
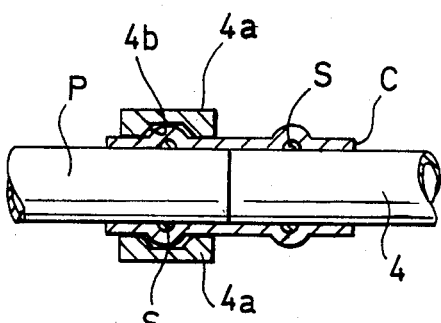
FIGS. 8 and 9 are sectional views to illustrate the mode of use of the tool of FIG. 1 in two different pipe joints.
Figure 9:
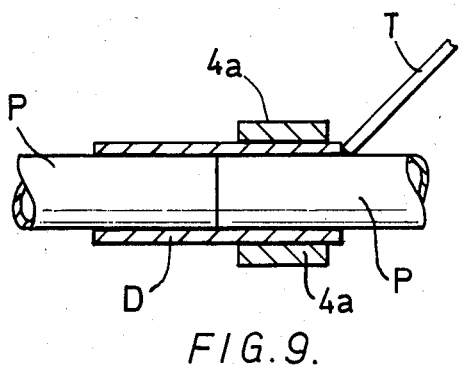

In the use of the tool for the formation of a soldered joint between two lengths of metallic pipe P (FIGS. 8 and 9), the head parts 4 are heated by the respective heating elements when electric current is supplied thereto. The handle parts of the arms 1 are manually gripped and closed towards each other so that the tool head parts are brought together to encircle a pipe connector. The pipe connector may be of the so-called "Yorkshire" type as shown in FIG. 8 including a cylindrical sleeve C provided with radially inwardly directed annular recesses in which solder S is stored. When used with such a pipe connector each head part recess 4a would be provided with a semi-circular inwardly directed groove 4b in which the part of the sleeve in the region of the recess would be received. Alternatively, as illustrated in FIG. 9, the abutting ends of two tubes P are bridged by a plain connecting sleeve D to which heat is applied by means of the tool as aforesaid while a stick of solder T is applied at the point of tube entry. Heat applied by the tool melts the solder which travels by capillary action within the sleeve and solidifies therein to seal the joint. A joint, thus, formed by use of the tool according to either of these methods provides a seal against egress of liquid or gas.

The embodiments of the invention in which an exclusive property or privilege is claimed are defined as follows:

1. A tool for heating a pipe connector sleeve in order to melt solder provided therein or applied thereto to secure said pipe connector sleeve to a pipe, said tool comprising:
   a pair of arms, each of said arms of said pair of arms having a first end and a second end, each of said pair of arms further being hingedly connected to one another between said first end and said second end of each said pair of arms, the first end of the first of said pair of arms being disposed adjacent the first end of the second of said pair of arms, the second end of the first of said pair of arms being disposed adjacent the second end of the second of said pair of arms;
   first electric heating element means having a first shaft portion, said first shaft portion enclosing an electric heating element and having a first end and a second end, the first end of said first shaft portion being secured to said first end of one of said pair of arms with said first shaft portion extending therefrom, a first metallic head part, said first metallic head part having a part-circular recess that is adapted to contact said pipe connector sleeve to apply heat thereto, said first metallic head part having a tubular shank by which it is detachably and slidably attached to said second end of said first shaft portion to permit the rapid changing of said first metallic head part; and
   second electric heating element means having a second shaft portion, said second shaft portion enclosing an electric heating element and having a first end and a second end, the first end of said second shaft portion being secured to said first end of the other of said pair of arms with said second shaft portion extending therefrom, a second metallic head part having a part-circular recess that is adapted to contact said pipe connector sleeve to apply heat thereto, said second metallic head part having a tubular shank by which it is detachably and slidably attached to said second end of said second shaft portion to permit the rapid changing of said second metallic head part;
   said first electric heating element means and said second electric heating element means, respectively, being adapted to heat said first metallic head part and said second metallic head part to a soldering temperature;
   the arms of said pair of arms being pivotable with respect to one another about said hinged connection therebetween so that the part-circular recess of said first metallic head part and the part-circular recess of said second metallic head part can be closed together in juxtaposed relationship around said pipe connector sleeve to apply heat to the pipe connector sleeve.

2. A tool according to claim 1 wherein said first shaft portion has a first central longitudinal axis, wherein said second shaft portion has a second central longitudinal axis and wherein each of the part-circular recesses of said first metallic head part and said second metallic head part has a central axis, said central axis of the part-circular recesses of said first metallic head part and said central axis of said second metallic head part lying transverse to and between said first central longitudinal axis and said second central longitudinal axis whereby said part-circular recess of said first metallic head part is offset from said first shaft portion toward said second shaft portion and said part-circular recess of said second metallic head part is offset from said second shaft portion toward said first shaft portion.

3. A tool according to claim 2 wherein each of said pair of arms has a socket at said one of said first and second ends to which the respective one of said first electric heating element means and said second electric heating element means is secured and extends, said first shaft portion of said first heating element means being received in said socket of one of said pair of arms, said second shaft portion of said second heating element means being received in said socket of the other of said pair of arms, and further comprising:
   a first externally corrugated bushing surrounding said first shaft portion adjacent said socket in which said first shaft portion is received, and a second externally corrugated bushing surrounding said second shaft portion adjacent said socket in which said second shaft portion is received.

4. A tool according to claim 1 wherein each of said pair of arms has a socket at said one of said first and second ends to which the respective one of said first electric heating element means and said second electric heating means is secured and extends, said first shaft portion of said first heating element means being received in said socket of one of said pair of arms, said second shaft portion of said second heating element means being received in said socket of the other of said pair of arms, and further comprising:
 a first externally corrugated bushing surrounding said first shaft portion adjacent said socket in which said first shaft portion is received, and a second externally corrugated bushing surrounding said second shaft portion adjacent said socket in which said second shaft portion is received.

* * * * *